United States Patent
Borg

(10) Patent No.: US 7,149,348 B1
(45) Date of Patent: Dec. 12, 2006

(54) TESTING IMAGE CONVERSION PRECISION

(75) Inventor: Lars U. Borg, Saratoga, CA (US)

(73) Assignee: Adobe Systems Incorporated, San Jose, CA (US)

(*) Notice: Subject to any disclaimer, the term of this patent is extended or adjusted under 35 U.S.C. 154(b) by 637 days.

(21) Appl. No.: 10/137,599

(22) Filed: May 1, 2002

(51) Int. Cl.
*G06K 9/00* (2006.01)

(52) U.S. Cl. .................. 382/162; 358/504; 358/518

(58) Field of Classification Search ........ 382/162–167, 382/100, 274–275, 300, 254; 358/1.9, 504, 358/515–525, 537, 539, 3.23, 1.15–1.18; 345/589–606; 101/483–484; 347/100–101, 347/115, 43; 704/81, 85, 189; 702/81, 85, 702/189
See application file for complete search history.

(56) References Cited

U.S. PATENT DOCUMENTS

| | | | | |
|---|---|---|---|---|
| 5,611,030 A | * | 3/1997 | Stokes ........................ | 345/590 |
| 5,689,350 A | * | 11/1997 | Rolleston .................... | 358/504 |
| 5,786,908 A | * | 7/1998 | Liang ......................... | 358/518 |
| 5,956,044 A | * | 9/1999 | Giorgianni et al. ......... | 345/590 |
| 6,178,007 B1 | * | 1/2001 | Harrington ................. | 358/1.9 |
| 6,204,939 B1 | * | 3/2001 | Lin et al. .................... | 358/518 |
| 6,208,351 B1 | | 3/2001 | Borg et al. ................. | 345/600 |
| 6,307,961 B1 | * | 10/2001 | Balonon-Rosen et al. .. | 382/167 |
| 6,330,078 B1 | * | 12/2001 | Wang ......................... | 358/1.9 |
| 6,340,975 B1 | * | 1/2002 | Marsden et al. ............ | 345/590 |
| 6,603,483 B1 | * | 8/2003 | Newman ..................... | 345/593 |
| 6,615,729 B1 | * | 9/2003 | Hauck et al. ............... | 101/484 |
| 6,754,382 B1 | * | 6/2004 | Borg .......................... | 382/165 |
| 6,798,904 B1 | | 9/2004 | Borg .......................... | 382/167 |
| 6,930,790 B1 | | 8/2005 | Forthoffer .................. | 358/1.15 |
| 7,023,585 B1 | * | 4/2006 | Borg .......................... | 358/1.9 |
| 2005/0018024 A1 | * | 1/2005 | Sommer et al. ............ | 347/100 |

OTHER PUBLICATIONS

U.S. Appl. No. 09/563,121, filed May 1, 2002, entitled "Color Rendering Dictionary for Testing Color Conversion".
Lars U. Borg, "Multi-Dimensional Edge Interpolation", U.S. Appl. No. 10/010,209, filed Dec. 6, 2001.

* cited by examiner

*Primary Examiner*—Ishrat Sherali
(74) *Attorney, Agent, or Firm*—Fish & Richardson P.C.

(57) ABSTRACT

Methods and apparatus, including computer program products, implementing and using techniques for testing image conversion precision. An original image in an original state is provided. The original image includes one or more test colors. Each test color is represented by one or more color component values in an original color space. The original image is converted to a converted image having a different state. The converted image is converted back to a back-converted image having the original state. A test profile is applied to the back-converted image to generate a final image, the test profile is operable to convert test colors to a first color and non-test colors towards a second, different color. It is determined whether any of the test colors in the original image has been converted to a color other than the first color in the final image.

47 Claims, 3 Drawing Sheets

|   | 0 | 1 | 2 | 3 | 4 | 5 |
|---|---|---|---|---|---|---|
| 0 | A | B | A | B | A | B |
| 1 | B | B | B | B | B | B |
| 2 | A | B | A | B | A | B |
| 3 | B | B | B | B | B | B |
| 4 | A | B | A | B | A | B |
| 5 | B | B | B | B | B | B |

FIG. 3

TESTING IMAGE CONVERSION PRECISION

BACKGROUND OF THE INVENTION

This invention relates to conversions of images between different representations.

Computers and related output devices, such as displays and printers, represent colors numerically, typically in the form of one or more color components in a color space. Each color component is represented as a numerical value and together the color component values provide the information necessary to generate a desired color on an output device. The device color space defines the interpretation of the color component values used to represent a color on a device. Examples of device color spaces are RGB (Red, Green and Blue) and CMYK (Cyan, Magenta, Yellow and Black). In most color spaces, a color is represented by one to four numbers, one for each component of the color space.

Different devices often use different color spaces to represent colors, which creates a need for converting colors between different color spaces. The International Color Consortium (ICC) promotes standardization of color management and has standardized a way to express color space definitions, which are also referred to as profiles. In an ICC-based color management system, there is a standard reference color space into or out of which color values from various device color spaces are transformed. This standard reference space is commonly known as a profile connection space (PCS). For each transformation from a device color space to the PCS, there is a source profile that defines how much device specific color is used to render a given color accurately in the PCS. For each transformation from the PCS to a device color space, there is a destination profile that defines how much device specific color is used to render accurately a color that is given in the PCS. In the ICC-based color management system, there are two profile connection spaces that can be used, the CIE (Commision Internationale de l'Eclairage) XYZ profile connection space and the CIE L*a*b* profile connection space. The ICC-based color management system makes it possible for all devices that participate in a workflow to display the same color, either in a perceptually pleasing sense or in some colorimetric sense.

Users, such as test engineers, that convert colors between device color spaces often have difficulties in determining if a color conversions has been done correctly. In particular, when a series of conversions between different color spaces is done, there may be a slight difference at each conversion that is hard or impossible to distinguish, but that results in an image with a different color appearance from the original. In such a situation, it is more or less impossible for the user to determine where in the series the incorrect color conversion occurred. The user typically has to resort to some form of trial and error method to solve the problem, which can be a very time consuming and non-systematic approach. A similar type of situation can occur when an image is converted between different formats, such as an 8-bit representation and a 16-bit representation, when an image is compressed and then expanded, and so on.

SUMMARY OF THE INVENTION

In general, in one aspect, this invention provides methods and apparatus, including computer program products, implementing and using techniques for testing image conversion precision. An original image in an original state is provided. The original image includes one or more test colors. Each test color is represented by one or more color component values in an original color space. The original image is converted to a converted image having a different state. The converted image is converted back to a back-converted image having the original state. A test profile is applied to the back-converted image to generate a final image, the test profile is operable to convert test colors to a first color and non-test colors towards a second, different color. It is determined whether any of the test colors in the original image has been converted to a color other than the first color in the final image.

Advantageous implementations can include one or more of the following features. The original state can represent an original color space and the different state can represent a different color space. The original color space and the different color space can be a color space selected from the group consisting of an RGB color space, an L*a*b* color space, an XYZ color space, an YCC color space, and a CMYK color space. Converting the original image to a converted image can include using a lookup table defining a conversion between two color spaces. The original state and the different state can represent different image compressions. The original state and the different state can represent different bit depths. The original state and the different state can represent different data types.

Applying a test profile to the back-converted image can include using a lookup table defining a conversion of test colors to a first color and non-test colors to a second, different color. The lookup table can include a plurality of gridpoints, each gridpoint defining a conversion from an input color to either the first color or the second color, and each gridpoint immediately adjacent to a gridpoint populated with the first color, can be populated with the second color. One or more input colors can be selected, the input colors corresponding to gridpoints populated with the first color in the lookup table, to be used as test colors in the original image. The original image can include only one test color. The test profile can be an ICC profile. A test profile can be applied to the original image to generate a reference image and the final image can be visually compared with the reference image to detect any differences resulting from conversions of the image between the original state and the one or more different states. The test profile can be an ICC profile.

In general, in one aspect, this invention provides methods and apparatus, including computer program products, implementing and using techniques for testing image conversion precision. An original image is provided in an original state. The original image includes one or more test colors that have an associated test profile. Each test color is represented by one or more color component values in an original color space. The image is processed in a process involving one or more conversions of the image to different states and the processing results in a processed image including the one or more test colors. A test profile is applied to the processed image to generate a final image. The test profile can convert test colors to a first color and non-test colors towards a second, different color. It is determined whether any of the test colors in the original image has been converted to a color other than the first color in the final image.

Advantageous implementations can include one or more of the following features. Processing the image can include processing the image in a black box process where a numerical representation of the one or more states of the original image and the processed image is not available. The process can be a printing process.

In general, in one aspect, this invention provides methods and apparatus, including computer program products, implementing and using techniques for providing an ICC test profile for testing the accuracy of color values in an image, the image including one or more test colors. The test profile includes a look-up table defining a conversion of the one or more test colors in the image to a first color and a conversion of the one or more non-test colors to a second, different color.

Advantageous implementations can include one or more of the following features. The look-up table can include several gridpoints. Each gridpoint can defines a conversion from an input color to either the first color or the second color. Two gridpoints populated with the first color can be separated by one or more gridpoints populated with the second color. The look-up table can include a plurality of gridpoints. Each gridpoint can define a conversion from an input color to either the first color or the second color, and each gridpoint immediately adjacent to a gridpoint populated with the first color can be populated with the second color. The input colors corresponding to gridpoints populated with the first color in the lookup table can be used as test colors in the image.

The invention can be implemented to realize one or more of the following advantages. A test profile can be constructed that changes the color state of in-test colors only and leave not-in-test colors unchanged. By applying a particular test profile for each color conversion between two color spaces, a user can easily determine whether the color conversion under test has been done accurately. Tests can be run and evaluated by an unskilled user, since the testing method includes a clear visual fail indication. The sensitivity of the error detection can be controlled. Test profiles can be made for all color spaces supported by ICC. Because the test method uses standard ICC profiles, the test method can be used in existing products without special considerations. End-user test tools can be provided with which a user can test third party products. The test profile can be applied in a "black box" environment or process, where it is not possible to track the color component values in every step of the process.

The details of one or more implementations of the invention are set forth in the accompanying drawings and the description below. Other features and advantages of the invention will be apparent from the description and drawings, and from the claims.

DESCRIPTION OF DRAWINGS

FIG. 3 is a simplified example of a look-up table supporting a test profile.

Like reference symbols in the various drawings indicate like elements.

DETAILED DESCRIPTION

Figure 1:
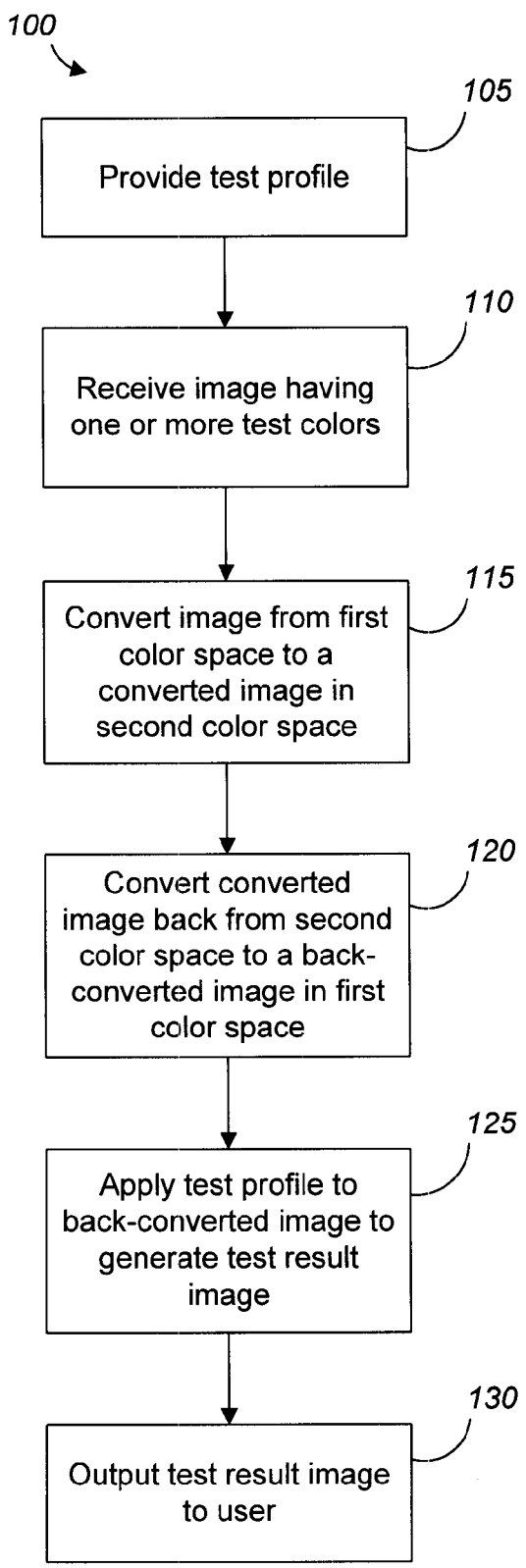
FIG. 1 is a flowchart showing a process for testing the accuracy of a profile-based color conversion between a first color space and a second color space.

An implementation of invention will be described below by way of example with reference to a color conversion application between two or more color spaces. It should, however, be noted that different implementations of the invention can be used to test other forms of image conversions. For example, various image compression methods can show round-trip errors in poor implementations and such erroneous conversions can be identified using an implementation of the invention. Furthermore, when data is converted from an original data format to a destination data format, such as from integer representation to a float representation, or from an 8-bit integer to a 16-bit integer, round-trip errors can occur that can be identified using the an implementation of the invention.

As described above, a source profile defines how much device-specific color is used to render a given color accurately in the PCS, and a destination profile defines how much device specific color is used to accurately render a color that is given in the PCS. The source and destination profiles in ICC color management systems are generally based on look-up tables (LUT). A simplified example of a LUT can be seen below in Table 1. The LUT shown in Table 1 supports conversion from a two-dimensional color space to a one-dimensional color space. The color component values of the two-dimensional color space are shown in the rows and columns, and the corresponding color component value in the one-dimensional color space is shown in the table grid points. As can be seen in Table 1, a color represented by the color component values (3, 5) in the two-dimensional color space is converted to a color component value with the value 150 in the one-dimensional color space, while a color represented by the color component values (5, 3) in the two-dimensional color space is converted to a color component value with the value 160 in the one-dimensional color space, and so on.

TABLE 1

|   | 0 | 1 | 2 | 3 | 4 | 5 |
|---|---|---|---|---|---|---|
| 0 | 0 | 5 | 15 | 30 | 50 | 75 |
| 1 | 10 | 20 | 35 | 55 | 80 | 105 |
| 2 | 25 | 40 | 60 | 85 | 110 | 130 |
| 3 | 45 | 65 | 90 | 115 | 135 | 150 |
| 4 | 70 | 95 | 120 | 140 | 155 | 165 |
| 5 | 100 | 125 | 145 | 160 | 170 | 175 |

In order to convert a color back from the one-dimensional color space to the two-dimensional color-space, the inverse of the LUT shown in Table 1 is applied. It should be noted that the LUT shown in Table 1 is just a schematic example.

In most practical applications, a color space has three or more components, so the two-dimensional LUT shown in Table 1 can be thought of as a three-dimensional "color cube." The primary purpose of the profiles that define a conversion between different color spaces is to retain the colors of an original image, no matter in which color space the image is represented.

A user can define and use a test profile in an ICC color management system, in order to verify that a given set of colors in an image are what the user intended. The set of colors and the test profile can be customized by the user depending on the image and color space to which the test profile is to be applied. There can be many reasons for testing that an image contains an accurate set of colors. For example, as was described above, a user may want to determine that a conversion between two or more color spaces has been performed accurately. A user may want to test whether an image created in one computer graphics application displays the original colors when the image is viewed or processed in a different computer graphics application. A PDF document, for example, can contain graphics that have been created in a variety of different color spaces and then been imported to the PDF document. If the PDF document is converted to a different format that uses a single color space, then a user may wish to determine that the color conversions into this single color space were performed accurately. Many other examples exist, and a few of them will be described below. First, however, an exemplary test profile will be described in further detail.

A test profile is a general profile that defines a mapping from one set of colors to another set of colors. It is however, advantageous to construct a test profile that is similar to conventional ICC profiles, as the test profile then can be used in existing applications without the need for special adaptations of the applications. Just like the ICC profiles described above for converting colors between two different color spaces, an ICC compliant test profile also supports a LUT. However, the purpose of the profiles described above was to preserve colors of an image when the image was converted between different color spaces. The purpose of a test profile is to verify that an image contains an accurate set of colors and is not concerned with preservation of the colors. Therefore, a LUT supporting a test profile will look much different from a LUT that is used to convert colors between to color spaces. A simplified example of a test profile is shown below in Table 2 and also as FIG. 3.

TABLE 2

|   | 0 | 1 | 2 | 3 | 4 | 5 |
|---|---|---|---|---|---|---|
| 0 | A | B | A | B | A | B |
| 1 | B | B | B | B | B | B |
| 2 | A | B | A | B | A | B |
| 3 | B | B | B | B | B | B |
| 4 | A | B | A | B | A | B |
| 5 | B | B | B | B | B | B |

The LUT shown in Table 2 defines a color transformation from a first, two-dimensional color space to a second color space, which may or may not be the same color space as the first color space. The LUT in Table 2 defines a transformation of colors, from a first color space with values in each dimension ranging from 0 to 5 as shown in the headers of columns 301 and rows 302, such that all colors under test are converted to a color A, while colors not under test are converted to a second color B. As can be seen from Table 2, the colors under test (also referred to as the set of test colors) whose accuracy can be tested with the test profile supported by the LUT in Table 2 are one or more of the colors (0, 0), (0, 2), (0, 4), (2, 0), (2, 2), (2, 4), (4, 0), (4, 2), and (4, 4).

As can be seen in Table 2, the LUT is mostly populated with color B. The grid points of color A are not adjacent to each other, but each grid point of color A is fully surrounded by grid points of color B. This determines the sensitivity of the test profile. Each grid point of color A does not have to be fully surrounded by grid point of color B. For example, by allowing colors (4, 1) and (4, 3) in the LUT in Table 2 to be converted to color A instead of color B, an alternative test profile is created that allows for small variations in the second input color component for the test color (4, 2). This alternative profile would yield a "pass" result, even if the second test color component deviates from the test color by one unit.

The user can select the colors A and B. It is advantageous to select the colors from different ends of a color space, for example, black and white, or green and red. This gives a user a very clear indication of when a color is not accurately represented. In a different implementation, a third color, C, can be used to indicate a small difference from the accurate color. This can for example be accomplished by surrounding all color A values in the LUT in Table 2 above with color C rather than with color B, and have the remaining elements of the LUT populated with color B. Alternatively, in another implementation several gridpoints with color A values can be adjacent to form a range of values that are interpreted as an accurate color, if an increased tolerance is desired.

The same basic LUT can be reused in several test profiles to test a given set of test colors, as long as the number of components in the color spaces where the test profile is applied is the same. The only modification that needs to be made to the LUT is that the LUT has to be scaled to fit the value range of the color spaces under test. For example, the L*a*b* color space has a value range of (0 to 100, −127 to +128, −127 to +128) for the L, a, and b components, respectively, while the RGB color space has a value range of 0 to 1 for each of its R, G, and B components. The value range should not be confused with the encoding range, which for both the L*a*b* color space and the RGB color space is 0 to 255. Furthermore, since the test profiles are supported by the ICC color management system, the test profiles can be used in any application that supports ICC profiles, without any need for particular adaptations of the application. It should be realized that a LUT as described above is not the only way to define a conversion between two color spaces. For example, the same result can be achieved using a modulo function.

If a color in the first color space is located between two gridpoints in the LUT, such as (1.5, 1.5), a conventional interpolation between colors A and B will take place and the resulting color in the second color space will be a color that is intermediate to colors A and B. If A and B are selected to be very different colors, even minor deviations from color A will be easy to distinguish.

A process in which a test profile is applied will now be described with reference to FIG. 1. In this exemplary process, the test profile is used to determine whether a color conversion from a first color space, to a second color space, and back to the first color space again is correctly performed.

As shown in FIG. 1, a process (100) for testing a profile-based color conversion starts by providing a test profile (105). The test profile can either be created by a user or selected from a set of available test profiles that are presented to the user. The test profile is adapted to be used to test the conversion of a specific set of test colors selected in the first color space.

When the test profile has been determined, the process receives an original image that has been created in the first color space and that contains the test colors associated with the test profile (110). The image can be created by a user, or be created automatically by the process itself and can contain test colors only, or a mix between test colors and non-test colors. The test colors in the image are selected by using the test profile to determine which colors in the first color space will be converted to color A when the test profile is applied. In one implementation, the set of test colors (or a subset thereof) can be determined manually by the user, who can also manually construct the corresponding test profile. In another implementation, the set of test colors are provided together with the corresponding test profile to the user.

After the process has received the image with the test colors, the process converts the image to a converted image represented in the second color space (115). It should be noted, however, that in many situations long sequences of conversions can be included. One example of when a long series of conversions takes place is conversions for so-called soft proofing.

When the conversion, or the last conversion in a series of conversions, has been made, the process converts the converted image back from the second color space to a back-converted image in the first color space (120).

The process then applies the test profile to the back-converted image in the first color space (125) to generate a test result image. Test colors converted correctly in the conversions from and to the second color space will have the color A, while poorly converted test values will have the color B. Consequently, any deviations from color A in areas of the image where the test colors have been applied indicate one or more incorrect conversions in step 115 or 120.

Finally, the process outputs the test result image on an output device, such as a display or a printer (130), thereby allowing a user to easily determine which colors among the test colors have been converted inaccurately.

It should be understood that there is no need to make a full "roundtrip" back to the first color space. For example, a user can test only a "one-way" conversion between two color spaces, such as from an RGB color space to an XYZ color space. In this case, the user selects a test profile to be applied in the XYZ color space and chooses the image colors in the RGB color space that should yield a set of test colors in the XYZ color space that matches the selected test profile. The colors in the RGB color space that yield specific colors in the XYZ color space can be found by studying an RGB-XYZ look-up table and determine which color component values in the RGB color space will generate the desired color component values in the XYZ color space. This type of test can, for example, be used to determine the accuracy of a "from profile," assuming that the RGB color space is an initial color space and that the XYZ color space is a profile connection space (PCS).

Another situation in which the test profile can be applied is in a "black box" environment or process, such as a printing process; in which a user cannot track every single step or conversion. By applying the test profile in the final step of the process, such as to a final image that is about to be printed, and instead printing (or otherwise displaying) the image resulting from the application of the test profile, the user can easily determine if the final image would have printed with accurate colors.

Figure 2:
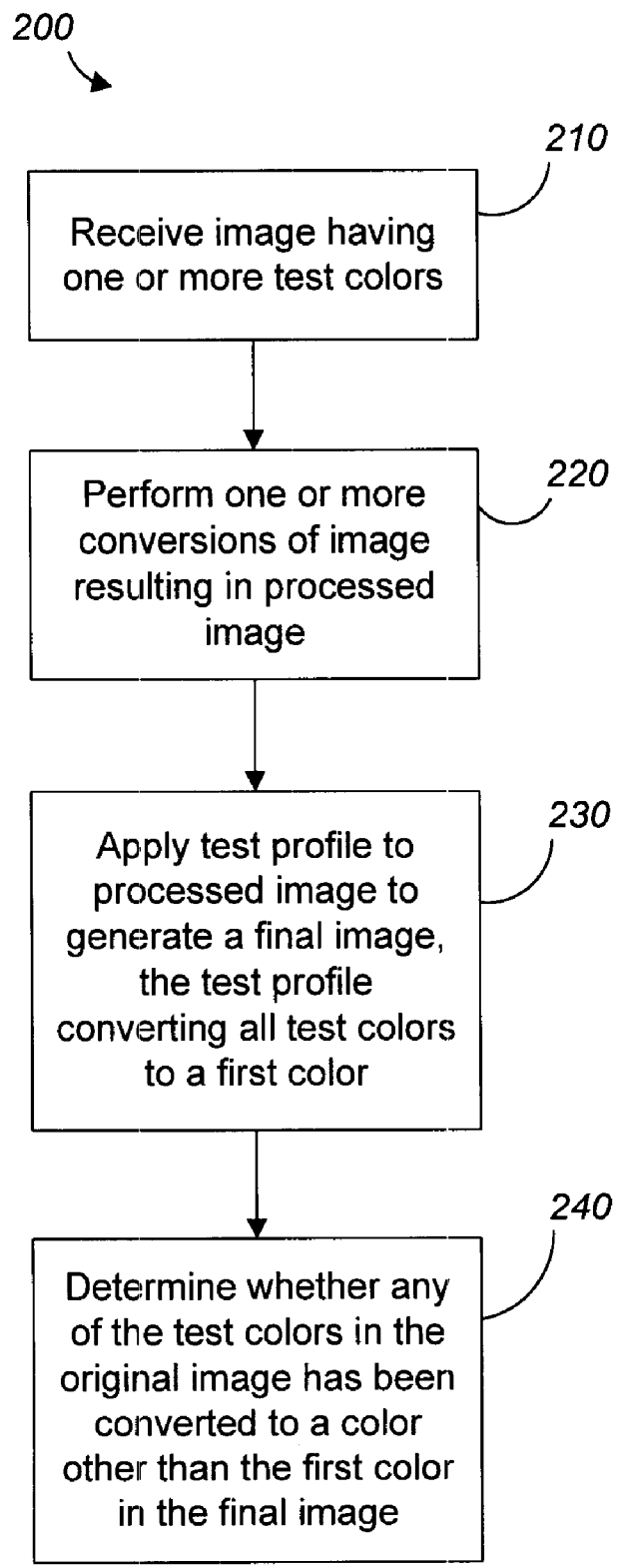
FIG. 2 is a flowchart showing a process for testing image conversion precision.

In general, in one aspect, this invention provides methods and apparatus, including computer program products, implementing and using techniques for testing image conversion precision. As shown in FIG. 2, in a process for testing image conversion precision 200, an original image is provided in an original state 210. The original image includes one or more test colors that have an associated test profile. Each test color is represented by one or more color component values in an original color space. The image is processed by one or more conversions of the image to different states and the processing results in a processed image including the one or more test colors 220. A test profile is applied to the processed image to generate a final image. The test profile can convert test colors to a first color and non-test colors to a second, different color. In step 240 the process determines whether any of the test colors in the original image has been converted to a color other than the first color in the final image.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, the steps of the invention can be performed in a different order and still achieve desirable results. The colors indicating correct or incorrect color conversions can be specified by the user or by the system. In the case of non-visual outputs, such as in a "print to file" operation, the output file can be analyzed for the presence of color values resulting from incorrect test color conversions. A "fail" indication can trigger other events, such as printing of a report that explains what colors are inaccurate, or an alarm that stops a printing process, and so on.

What is claimed is:

1. A method for testing image conversion precision, comprising:

provide an original image in an original state, the original image including one or more test colors, each test color being represented by one or more color component values in an original color space;

converting the original image to a converted image having a different state;

converting the converted image back to a back-converted image having the original state;

applying a test profile to the back-converted image to generate a final image, the test profile being operable to convert test colors to a first color and non-test colors to a second, different color; and determining whether any of the test colors in the original image has been converted to a color other than the first color in the final image.

2. The method of claim 1, wherein the original state represents an original color space and the different state represents a different color space.

3. The method of claim 2, wherein the original color space is a color space selected from the group consisting of an RGB color space, an L*a*b* color space, an XYZ color space, an YCC color space, and a CMYK color space.

4. The method of claim 2, wherein the different color space is a color space selected from the group consisting of an RGB color space, an L*a*b* color space, an XYZ color space, an YCC color space, and a CMYK color space.

5. The method of claim 2, wherein converting the original image to a converted image comprises using a lookup table defining a conversion between two color spaces.

6. The method of claim 1, wherein the original state and the different state represent different image compressions.

7. The method of claim 1, wherein the original state and the different state represent different bit depths.

8. The method of claim 1, wherein the original state and the different state represent different data types.

9. The method of claim 1, wherein applying a test profile to the back-converted image comprises using a lookup table defining a conversion of test colors to a first color and non-test colors to a second, different color.

10. The method of claim 9, wherein the lookup table comprises a plurality of gridpoints, each gridpoint defining a conversion from an input color to either the first color or the second color, and wherein each gridpoint immediately adjacent to a gridpoint populated with the first color, is populated with the second color.

11. The method of claim 9, further comprising selecting the one or more input colors, the input colors corresponding to gridpoints populated with the first color in the lookup table, to be used as test colors in the original image.

12. The method of claim 1, wherein the original image includes only one test color.

13. The method of claim 1, wherein the test profile is an ICC profile.

14. The method of claim 1, further comprising:
applying the test profile to the original image to generate a reference image; and
visually comparing the final image with the reference image to detect any differences resulting from conversions of the image between the original state and the different state.

15. The method of claim 14, wherein the test profile is an ICC profile.

16. A method for testing image conversion precision, comprising:
providing an original image in an original state, the original image including one or more test colors, each test color being represented by one or more color component values in an original color space;
processing the image in a process involving one or more conversions of the image to different states, the processing resulting in a processed image;
applying a test profile to the processed image to generate a final image, the test profile being operable to convert test colors to a first color and non-test colors to a second, different color; and
determining whether any of the test colors in the original image has been converted to a color other than the first color in the final image.

17. The method of claim 16, wherein processing the image includes:
processing the image in a black box process where a numerical representation of the one or more states of the original image and the processed image is not available.

18. The method of claim 16, wherein the process is a printing process.

19. The method of claim 16, wherein the original state represents an original color space and the different state represents a different color space.

20. The method of claim 16, wherein the original state and the different state represent different image compressions.

21. The method of claim 16, wherein the original state and the different state represent different bit depths.

22. The method of claim 16, wherein the original state and the different state represent different data types.

23. An ICC test profile for testing the accuracy of color values in an image, the image including one or more test colors, comprising:
a look-up table defining a conversion of the one or more test colors in the image to a first color and a conversion of the one or more non-test colors to a second, different color, wherein the look-up table comprises a plurality of gridpoints, each gridpoint defining a conversion from an input color to either the first color or the second color, and two gridpoints populated with the first color are separated by one or more gridpoints populated with the second color.

24. An ICC test profile for testing the accuracy of color values in an image, the image including one or more test colors, comprising:
a look-up table defining a conversion of the one or more test colors in the image to a first color and a conversion of the one or more non-test colors to a second, different color, wherein the look-up table comprises a plurality of gridpoints, each gridpoint defining a conversion from an input color to either the first color or the second color, and each gridpoint immediately adjacent to a gridpoint populated with the first color is populated with the second color.

25. The test profile of claim 23, wherein the input colors corresponding to gridpoints populated with the first color in the lookup table are used as test colors in the image.

26. A computer program product, tangibly stored on a computer-readable medium, for testing image conversion precision, comprising instructions operable to cause a programmable processor to:
provide an original image in an original state, the original image including one or more test colors, each test color being represented by one or more color component values in an original color space;
convert the original image to a converted image having a different state;
convert the converted image back to a back-converted image having the original state;
apply a test profile to the back-converted image to generate a final image, the test profile being operable to convert test colors to a first color and non-test colors to a second, different color; and
determine whether any of the test colors in the original image has been converted to a color other than the first color in the final image.

27. The computer program product of claim 26, wherein the original state represents an original color space and the different state represents a different color space.

28. The computer program product of claim 27, wherein the original color space is a color space selected from the group consisting of an RGB color space, an L*a*b* color space, an XYZ color space, an YCC color space, and a CMYK color space.

29. The computer program product of claim 27, wherein the different color space is a color space selected from the group consisting of an RGB color space, an L*a*b* color space, an XYZ color space, an YCC color space, and a CMYK color space.

30. The computer program product of claim 27, wherein the instructions to convert the original image to a converted image comprises instructions to use a lookup table defining a conversion between two color spaces.

31. The computer program product of claim 26, wherein the original state and the different state represent different image compressions.

32. The computer program product of claim 26, wherein the original state and the different state represent different bit depths.

33. The computer program product of claim 26, wherein the original state and the different state represent different data types.

34. The computer program product of claim 26, wherein the instructions to apply a test profile to the back-converted image comprises instructions to use a lookup table defining a conversion of test colors to a first color and non-test colors to a second, different color.

35. The computer program product of claim 34, wherein the lookup table comprises a plurality of gridpoints, each gridpoint defining a conversion from an input color to either the first color or the second color, and wherein each gridpoint immediately adjacent to a gridpoint populated with the first color, is populated with the second color.

36. The computer program product of claim 34, further comprising instructions to select the one or more input colors, the input colors corresponding to gridpoints populated with the first color in the lookup table, to be used as test colors in the original image.

37. The computer program product of claim 26, wherein the original image includes only one test color.

38. The computer program product of claim 26, wherein the test profile is an ICC profile.

39. The computer program product of claim 26, further comprising instructions to:
apply the test profile to the original image to generate a reference image; and
compare the final image with the reference image to detect any differences resulting from conversions of the image between the original state and the different state.

40. The computer program product of claim 39, wherein the test profile is an ICC profile.

41. A computer program product, tangibly stored on a computer-readable medium, for testing image conversion precision, comprising instructions operable to cause a programmable processor to:
provide an original image in an original state, the original image including one or more test colors, each test color being represented by one or more color component values in an original color space;
process the image in a process involving one or more conversions of the image to different states, the processing resulting in a processed image;
apply a test profile to the processed image to generate a final image, the test profile being operable to convert test colors to a first color and non-test colors to a second, different color; and
determine whether any of the test colors in the original image has been converted to a color other than the first color in the final image.

42. The computer program product of claim 41, wherein processing the image includes:
processing the image in a black box process where a numerical representation of the one or more states of the original image and the processed image is not available.

43. The computer program product of claim 41, wherein the process is a printing process.

44. The computer program product of claim 16, wherein the original state represents an original color space and the different state represents a different color space.

45. The computer program product of claim 41, wherein the original state and the different state represent different image compressions.

46. The computer program product of claim 41, wherein the original state and the different state represent different bit depths.

47. The computer program product of claim 41, wherein the original state and the different state represent different data types.

* * * * *

UNITED STATES PATENT AND TRADEMARK OFFICE
CERTIFICATE OF CORRECTION

PATENT NO. : 7,149,348 B1
APPLICATION NO. : 10/137599
DATED : December 12, 2006
INVENTOR(S) : Lars U. Borg It is certified that error appears in the above-identified patent and that said Letters Patent is hereby corrected as shown below:

Column 9, lines 6 and 10, delete the second occurrence of "an" and replace with --a--;
               lines 7 and 11, delete "an" and replace with --a--;
Column 11 lines 2 and 7, delete both occurrences of "an" and replace with --a--;
Column 12, line 32, delete "16" and insert --41--.

Signed and Sealed this

Thirtieth Day of January, 2007

JON W. DUDAS
*Director of the United States Patent and Trademark Office*